United States Patent [19]

Tsunoda et al.

[11] Patent Number: 4,536,761

[45] Date of Patent: Aug. 20, 1985

[54] RADIO PAGING RECEIVER HAVING DISPLAY CONTROL MEANS

[75] Inventors: Kazuyuki Tsunoda; Yoshio Ichikawa, both of Tokyo, Japan

[73] Assignee: Nippon Electric Co., Ltd., Tokyo, Japan

[21] Appl. No.: 466,383

[22] Filed: Feb. 10, 1983

[30] Foreign Application Priority Data

Feb. 12, 1982 [JP] Japan ................................. 57-19764

[51] Int. Cl.³ .......................... H04B 5/04; H04Q 9/00
[52] U.S. Cl. ................................ 340/825.44; 340/799; 455/38
[58] Field of Search ............. 455/38; 340/799, 825.44, 340/311.1; 179/2 EB; 307/141

[56] References Cited

U.S. PATENT DOCUMENTS 4,091,373 5/1978 Nakamura ............................. 455/38
4,412,217 10/1983 Willard et al. ................. 340/825.44

FOREIGN PATENT DOCUMENTS 2118337A 10/1983 United Kingdom ............ 340/311.1

Primary Examiner—Donald J. Yusko
Attorney, Agent, or Firm—Sughrue, Mion, Zinn, Macpeak & Seas

[57] ABSTRACT

A radio paging receiver which generates an alert tone and a message display on receipt of a selective calling signal, includes a manually operated non-lock type switch which generates first and second control signals. The first control signal stops the generation of the alert tone while the second control signal initiates a time-out period after which the displayed message is turned off. Depressing the switch produces the first control signal while its release produces the second control signal.

6 Claims, 11 Drawing Figures

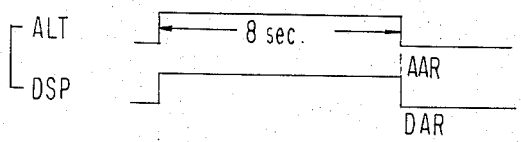
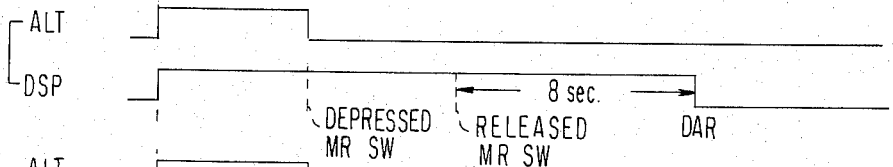
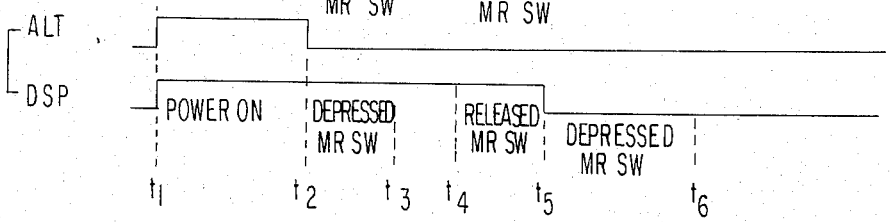
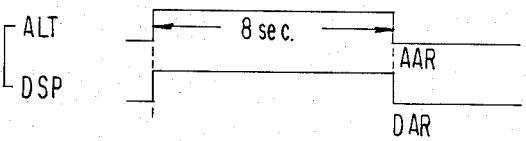
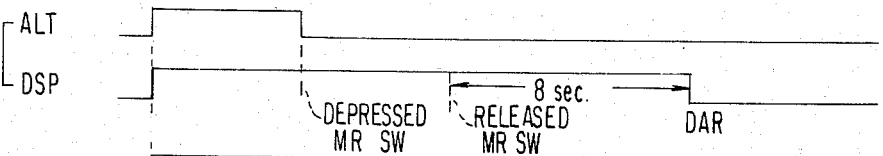
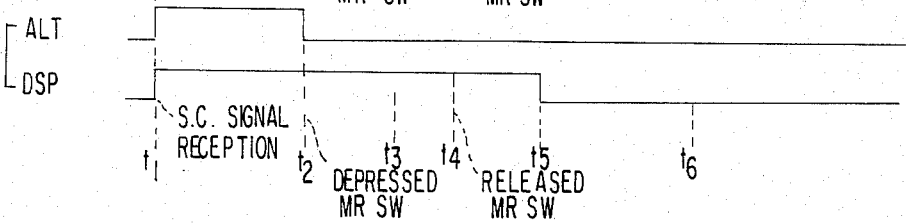
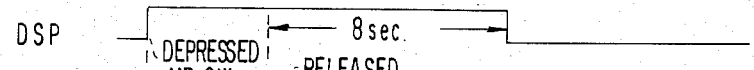
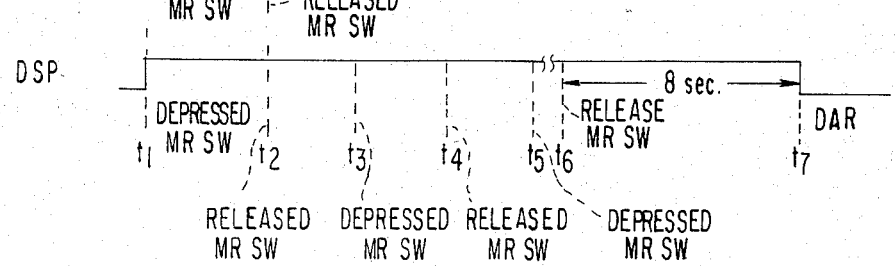

RADIO PAGING RECEIVER HAVING DISPLAY CONTROL MEANS

BACKGROUND OF THE INVENTION

The present invention relates to a radio paging receiver and, more particularly, to an improvement in the control means for the display and alert tones.

Radio paging receivers with display function in the prior art generate alert tones upon reception of a selective calling signal and store display information (or a message) subsequent to the selective calling signal. The alert tone stops when a switch is pressed down, and the stored display information is simultaneously displayed on a visual display device. Examples of such receivers are disclosed in U.S. Pat. No. 4,091,373 issued to J. Nakamura and also in U.S. Pat. No. 4,249,165 issued to T. Mori and assigned to the assignee of the present application. In these radio paging receivers, stored display information can be displayed, when needed, by depressing a switch; however, as the switch is released, the information on the display device immediately disappears. In order to confirm the displayed information, the switch must be continuously depressed.

In order to obviate such inconvenience, there has been proposed a selective paging receiver provided with a timer which is activated when a switch is pressed down to control the display on the display device by the output of the timer. Reference is made to the Japanese Patent Publication No. 55-2099 dated Jan. 18, 1980. According to the system described in this reference, manual operation of a switch can operate the receiver to reset a sound circuit for alert tones and at the same time to activate a display device for a predetermined time preset by the timer function thereof. The receiver, however, still is defective in that the information can not be visually presented while the alert tone is present. Further, if the time for the visual display is preset for a predetermined short period of time, a longer information can not be displayed while if it is preset for a predetermined longer period of time, a short information unavoidably leaves a void space.

SUMMARY OF THE INVENTION

An object of the present invention is to provide a radio paging receiver having user friendly display control means wherein a reset means for the alert tones and a reset means for the display are separately provided so that an optimum time period for visual display can be set, thereby eliminating mistakes caused by overlooking of the display or carelessness in switching-off the operation.

According to the present invention, there is provided a radio paging receiver having a display means, said receiver comprising a first means for detecting a selective calling signal assigned to the receiver; a second means for storing a message signal transmitted subsequently to the selective calling signal; a third means for generating an alert tone in response to the output of the first means; a fourth means for displaying for a first predetermined time period the message signal stored in the second means on said display means in response to the output of the first means; a fifth means for stopping the generation of the alert tone in response to a first control signal; a sixth means responsive to a second control signal for defining first predetermined time period; and a seventh means for generating the first and second control signals in response to respectively, the actuation and release of a switch.

BRIEF DESCRIPTION OF THE DRAWINGS

Other objects, features and advantages of the present invention will now be described in more detail referring to the attached drawings wherein:

FIGS. 3A to 3C, 4A to 4C, 5A and 5B are time charts to explain the operation of the receiver shown in FIG. 1 and, more specifically, the control function for the alert tone and the display at the times when the power source is turned on, when a calling signal is received, and when the receiver is waiting to receive the calling signal, respectively.

DESCRIPTION OF THE PREFERRED EMBODIMENT

Figure 1:
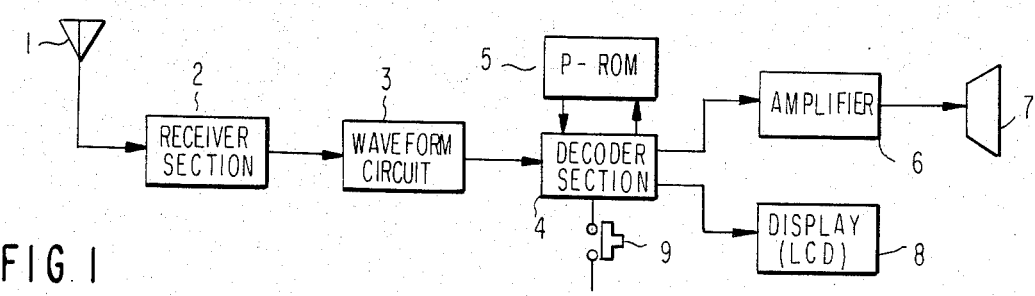
FIG. 1 is a schematic block diagram to show an embodiment of the radio paging receiver having user friendly display control means according to the present invention.

In FIG. 1, a radio calling signal received by an antenna 1 is amplified and demodulated by a receiver section 2. The demodulated signal is converted to a rectangular wave signal by a waveform shaping circuit 3 to be supplied to a decoder section 4. The calling signal employed may be the one disclosed in U.S. Pat. No. 4,194,153 issued to M. Masaki et al and assigned to the assignee of the present invention.

While the output from the waveform shaper circuit 3 is being fed to the decoder section 4, a preamble signal is first detected, and then the battery saving function is suspended with the battery kept turned on. Then, as a word synchronization code is detected, the operation proceeds to the detection of the selective calling signal assigned to the receiver in which the received calling signal is compared with the one written in a programmable read-only memory (P-ROM) 5. When the assigned selective calling signal is detected, an alert tone is immediately provided. A message signal subsequently following the selective calling signal is received at the same time.

The alert tone is amplified by an amplifier 6 to drive a speaker 7. The message signal is fed to a display device 8, made of, for example, liquid crystal display (LCD) for display. As an end mark code is finally detected by the decoder section 4, the battery saving operation is restored. The battery saving operation mentioned above is substantially the same as the one disclosed in "Digital Radio Paging Communication System" by Masaki et al.

Figure 2:
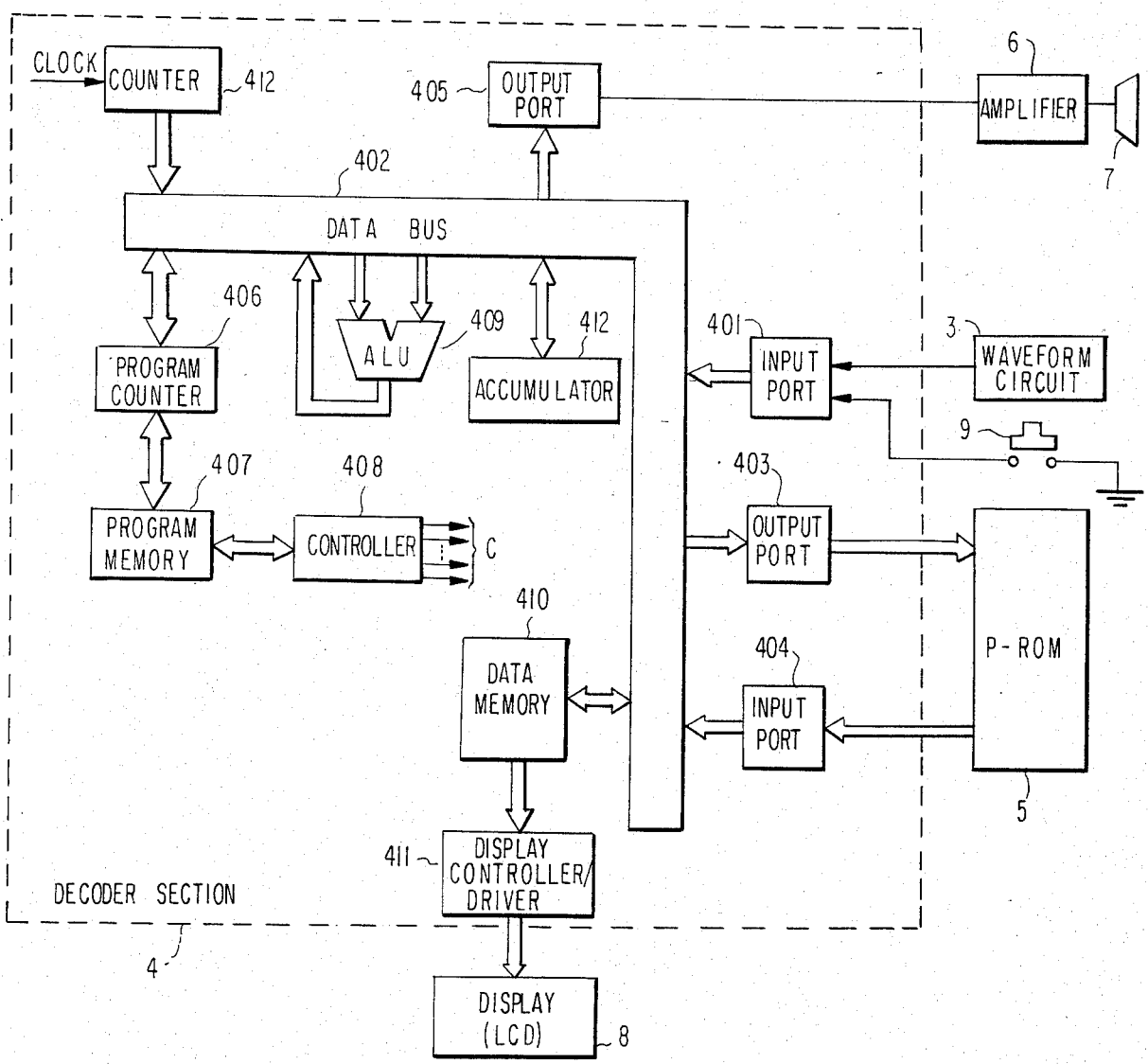
FIG. 2 is a block diagram of a decoder section of the receiver shown in FIG. 1.

In FIG. 2, a decoder 4 may be a single-chip central Drocessing unit (CPU), such as the microprocessor μPD7502 manufactured and marketed by the assignee of the present application, Nippon Electric Co., Ltd. The demodulated signal from the waveform shaping circuit 3 is supplied to a data bus 402 through an input port 401. An output port 403 receives an instruction via the data bus 402 and provides address signals in order to read out of the (P-ROM)5 a calling number data corresponding to the assigned selective calling signal. An input port 404 receives the data read out of the PROM 5 and transmits the same to the data bus 402. An output port 405 receives an instruction via the data bus 402 and feeds an alert tone to the amplifier 6.

A program counter 406 is activated as it receives the input from the data bus 402 and supplies an address to a program memory 407. Instruction group codes which are read out by the address, are supplied to a control circuit 408. The control circuit 408 decodes the codes and supplies control signals C to other blocks in order to carry out the instructions. An arithmetic and logic unit (ALU) 409 executes arithmetic calculations, the result of which is stored in an accumulator 412. The accumulator is also used for data exchange among the memory, input/output (I/0) ports, and registers. A data memory 410 stores the content of the message signal which has been supplied from the input port 401 to the data bus 402 subsequent to the selective calling signal. The stored message signal is fed to LCD 8 via a display control/driver 411 for a predetermined time by controlling the timer housed in the data memory 410 for display.

As illustrated in FIG. 2, a manual reset (MR) switch 9 whose operation will be described hereinafter, is connected between the input port 401 and, for instance, ground.

Although a non-lock type push-switch is assumed to be used as the MR switch 9 in the following description, the MR switch may be any other non-lock type switch, such as a slide-switch of this type.

In the case where the receiver has alert tone autoreset (AAR) and display auto-reset (DAR) functions which will be described later, the decoder section 4 includes timer counters (not shown) for these functions. When the MR switch 9 is depressed, the timer counter for the AAR function is reset to eliminate the alert tone alone. When the MR switch 9 is released, the timer counter for the DAR function is re-started. Under the control of the controller 408, a counter 412 generates timing signals to drive respective elements in the decoder section in response to the clock from outside and supplies the same to the elements through the data bus 402.

For a detailed description of the CPU shown in FIG. 2, reference is made to the User's Manual of the μPD7502, published by Nippon Electric Co., Ltd., May 23, 1980.

Figure 6:
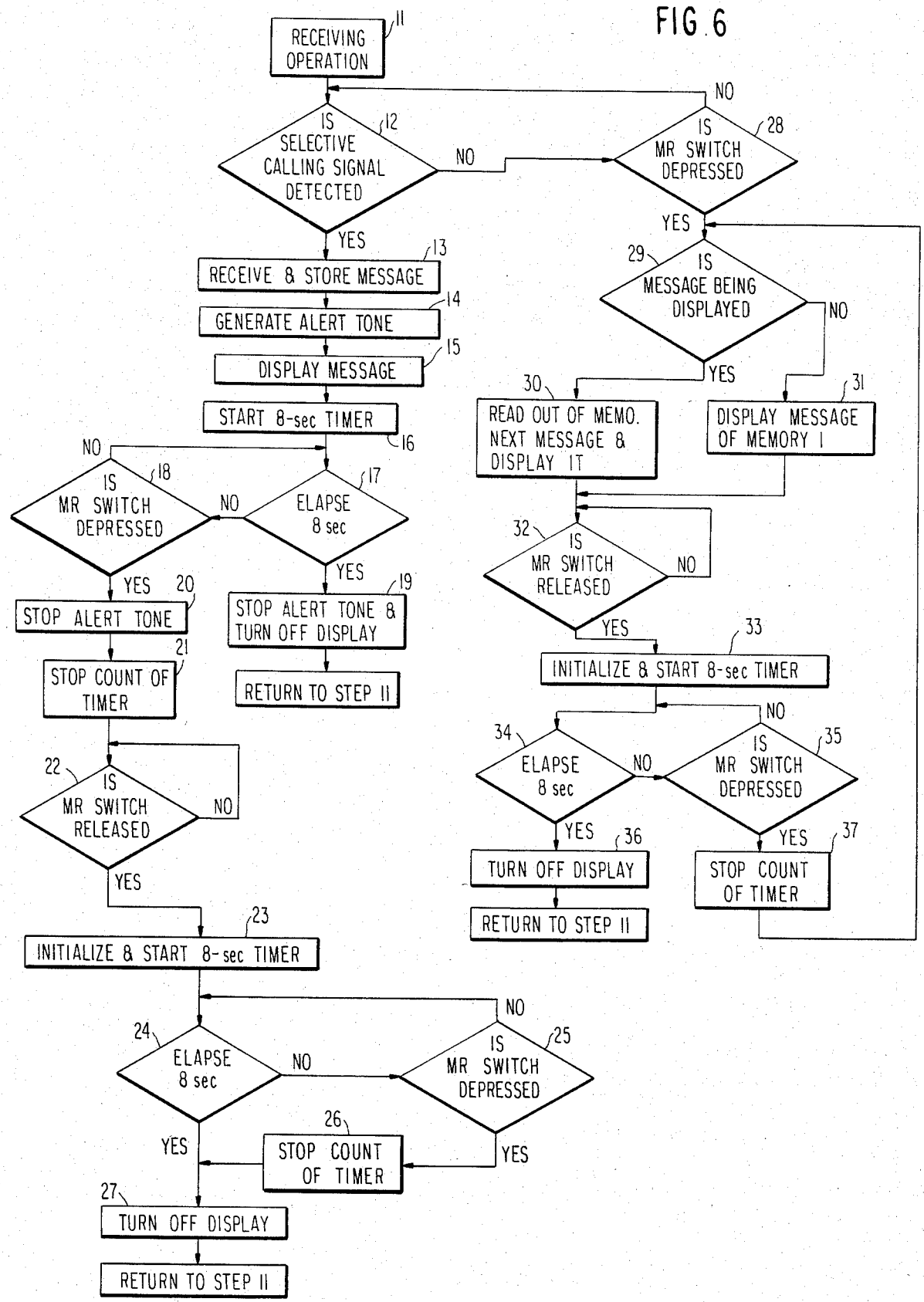
FIG. 6 is a flow chart to explain the operation of the receiver shown in FIG. 1.

The control to stop the alert tones and the control to drive the display will now be described referring to the time charts shown in FIGS. 3A to 3C, 4A to 4C, 5A and 5B and the flow chart of FIG. 6. In the time charts, the abbreviation ALT stands for the control chart of the alert tones while DSP stands for the control chart of the display.

Referring to FIGS. 3A to 3C, the control will now be explained when a power switch (not shown) is turned on. After the power switch is turned on at the time point $t_1$, if the manual reset (MR) switch 9 is not used, the alert tone and the display are suspended after a given period of time, or preferably after 8 seconds, at the time point $t_3$ as illustrated in FIG. 3A. This operation is done in the case where the receiver is provided with alert tone autoreset (AAR) and display auto-reset (DAR) functions with which alert tone and display are automatically eliminated after 8 seconds, respectively. In the case where the receiver does not have such an AAR function, it will assume the operation as shown in FIG. 3B. After the power switch is turned on at the time point $t_1$, the alert tone alone is suspended at the time point $t_2$ when the MR switch 9 is depressed, and the display is stopped by DAR function at the time point $t_6$, or 8 seconds after the time point $t_4$ when the MR switch 9 is released. Even in the receiver with AAR function, if MR switch 9 is pressed within 8 seconds from the turning-on of the power switch, the alert tone immediately stops thereon and the display is automatically suspended by DAR function after 8 seconds from the release of the MR switch. The operation will become identical to the one shown in FIG. 3B.

In FIG. 3C, the MR switch is pressed down at the time point $t_2$ within 8 seconds from the time point $t_1$ when the power switch is turned on and the MR switch is released at the time point $t_4$. If the MR switch is pressed again within 8 seconds after its release or at the time point $t_5$, the display is suspended therefrom.

Secondly, the control at the time a calling signal is received will be described referring to FIGS. 4A to 4C and 6. In the description hereinafter, the numbers to indicate respective steps in the flow charts in FIG. 6 will be written in parenthesis after the explanatory phrases or sentences. If a selective calling signal is detected (Step 12), a message signal subsequent to the selective calling signal is received and stored (Step 13). At the same time, the alert tone is emitted and the message signal is displayed on the LCD8 from the time point $t_1$ (Steps 14, 15), as shown in FIG. 4A. The 8-second timer counters (called AAR and DAR timer counters hereinafter, respectively) for the AAR and DAR functions are simultaneously activated (Step 16). As illustrated in FIG. 4A, when the 8-second timer counters come to the end of the preset time period, the alert tone and the display automatically stop at the time point $t_3$ (Steps 17 and 19).

If the MR switch 9 is pressed at the time point $t_2$ before 8 seconds expire as in FIG. 4B, the alert tone becomes suspended from thereon and the DAR timer counter stops its counting (Steps 18, 20 and 21). At the time point $t_4$, as the MR switch 9 is released, this 8-second timer counter is simultaneously preset again to start counting (Steps 22 and 23). When 8 seconds elapse under this condition at the time point $t_6$, the display stops as shown in FIG. 4B and returns to stand ready for the reception of the next calling signal (Steps 24 and 27). If as illustrated in FIG. 4C, the MR switch 9 is depressed at the time point $t_5$ before 8 seconds set on the display timer counter elapse, the timer counter stops counting and simultaneously suspends the display to return to the stand-ready condition (Steps 25, 26 and 27).

If the MR switch 9 is depressed at the time point $t_1$ while standing ready as shown in FIG. 5A, and if plural messages are stored in the data memory 410 (See FIG. 2), the latest message will be displayed first (Steps 28 and 31). Concurrently with MR switch release at the time point $t_2$, the DAR 8-second timer counter starts counting (Steps 32 and 33) and after 8 seconds have elapsed, the display is ceased to return to the condition of stand-ready (Steps 34 and 36).

As shown in FIG. 5B, the MR switch 9 is depressed at the time point $t_3$ before 8 seconds elapse after the release of the MR switch (Step 35), the DAR timer counter stops its counting (Step 37) and displays the second latest message (Steps 29 and 30). Similarly, if the MR switch 9 is depressed before 8 seconds elapse on the DAR timer counter after the release of the MR switch as shown in FIG. 5B, for instance at the time point $t_5$, the messages in the data memory 410 will be sequentially read out and displayed. When all of the stored plural messages have been displayed, it returns to the latest message and recycles the display.

As is obvious from the description in the foregoing, according to the present invention, the audible alert tone can be stopped by depressing the MR switch while the visual display can be erased after a predetermined period of time by releasing the MR switch. In short, this invention incorporates a very simple manual element in the conventional automatic reset function for display operation to enhance flexibility as well as reliability of the paging receiver. For instance, when one attempts to give a phone call while looking at a phone number displayed on the display device, one can keep the number kept on display by pushing down the MR switch. Further, the DAR function of the receiver can prevent errors in operation caused when one forgets to turn off the display or to maintain/release a message.

What is claimed is:

1. A radio paging receiver having a display means and a switch which can be selectively activated and released, said receiver comprising:
    a first means for detecting a selective calling signal assigned to said receiver;
    a second means for receiving and storing a message transmitted subsequently to said selective calling signal;
    a third means for generating an alert tone in response to the detection of said selective calling signal;
    a fourth means for displaying the message stored in said second means on said display means in response to the reception of said message;
    a fifth means for stopping the generation of said alert tone and the display of said message after a first predetermined period of time has elapsed;
    a sixth means for stopping the generation of said alert tone when said switch is activated within said first predetermined period of time;
    a seventh means for stopping the display of said message after a second predetermined period of time that starts from the release of the activated switch; and
    an eighth means for stopping the display of said message when said switch is activated within said second predetermined period of time.

2. A radio paging receiver, as claimed in claim 1, further comprising:
    a ninth means for displaying all the stored messages from the latest one to the oldest when said switch is repeatedly activated while said receiver stands ready for receiving a selective calling signal thereto; and
    a tenth means for stopping the display by said ninth means after a third predetermined period of time that starts from the release of said switch.

3. A radio paging receiver, as claimed in claim 2, wherein said first through third predetermined periods of time are of the same length.

4. A radio paging receiver, as claimed in claim 3, wherein said same length of time is 8 seconds.

5. A radio paging receiver, as claimed in claim 1, wherein said switch is a non-lock type push-switch.

6. A method for displaying a message on the display means of a paging receiver, comprising the following steps;
    a. detecting a selective calling signal followed by said message and assigned to said paging receiver;
    b. generating an alert tone in response to the detection of said selective calling signal;
    c. receiving and storing said message;
    d. displaying the stored message;
    e. stopping the generation of said alert tone in response to the activation of a switch included in said paging receiver; and
    f. stopping the display of said message after a first preset period of time that starts from the release of the activated switch.

* * * * *

UNITED STATES PATENT AND TRADEMARK OFFICE
CERTIFICATE OF CORRECTION

PATENT NO. : 4,536,761

DATED : August 20, 1985

INVENTOR(S) : Kazuyuki TSUNODA

It is certified that error appears in the above-identified patent and that said Letters Patent is hereby corrected as shown below:

Column 3, line 29, "autoreset" should read --auto-reset--;

line 60, "autoreset" (first occurence) should read --auto-reset--;

Signed and Sealed this

Twenty-second Day of April 1986

[SEAL]

Attest:

DONALD J. QUIGG

Attesting Officer

Commissioner of Patents and Trademarks